(12) United States Patent
Edwards et al.

(10) Patent No.: US 11,595,225 B2
(45) Date of Patent: Feb. 28, 2023

(54) SYSTEM AND METHOD FOR UTILIZATION OF DEVICE-INDEPENDENT SCENES IN A SMART HOME ENVIRONMENT

(71) Applicant: PCMS Holdings, Inc., Wilmington, DE (US)

(72) Inventors: Keith Edwards, Atlanta, GA (US); Patrick Thomas Igoe, Philadelphia, PA (US); Sanghoon Kim, Chadds Ford, PA (US)

(73) Assignee: DRNC Holdings, Inc., Wilmington, DE (US)

( * ) Notice: Subject to any disclaimer, the term of this patent is extended or adjusted under 35 U.S.C. 154(b) by 802 days.

(21) Appl. No.: 16/317,803

(22) PCT Filed: Aug. 10, 2017

(86) PCT No.: PCT/US2017/046269
§ 371 (c)(1),
(2) Date: Jan. 14, 2019

(87) PCT Pub. No.: WO2018/034935
PCT Pub. Date: Feb. 22, 2018

(65) Prior Publication Data
US 2021/0288831 A1    Sep. 16, 2021

Related U.S. Application Data

(60) Provisional application No. 62/377,206, filed on Aug. 19, 2016.

(51) Int. Cl.
*H04L 12/28* (2006.01)
*G05B 15/02* (2006.01)

(52) U.S. Cl.
CPC .......... *H04L 12/282* (2013.01); *G05B 15/02* (2013.01); *H04L 12/2809* (2013.01);
(Continued)

(58) Field of Classification Search
CPC .............. H04L 12/282; H04L 12/2832; H04L 12/2809; H04L 2012/285; G05B 15/02; G05B 2219/2642
See application file for complete search history.

(56) References Cited

U.S. PATENT DOCUMENTS 7,099,723 B2    8/2006  Gonzales
8,490,006 B1    7/2013  Reeser
(Continued)

FOREIGN PATENT DOCUMENTS

CN    1926512 A    3/2007
CN    105527953 A    4/2016
(Continued)

OTHER PUBLICATIONS

International Search Report and Written Opinion of the International Searching Authority for PCT/US2017/046269 dated Oct. 27, 2017.
(Continued)

*Primary Examiner* — Charles R Kasenge
(74) *Attorney, Agent, or Firm* — Invention Mine LLC (57) ABSTRACT

Systems and methods are provided for implementing a device-independent scene in a home automation environment. One embodiment is a method comprising receiving information regarding a home-independent home automation scene, the information identifying a zone property and an identified zone type; identifying, in the designated home, a zone corresponding to the identified zone type; identifying at least one home automation device capable of affecting the zone property in the identified zone; for each of the identified devices, identifying a device state of the respective device that contributes to the zone property; storing a home-automation scene for the designated home, wherein the home-automation scene comprises information identifying the at least one identified devices and the respective
(Continued)

identified device states of those devices; and in response to user selection of the stored home-automation scene, causing the at least one identified device to perform the respective identified actions.

17 Claims, 5 Drawing Sheets

(52) U.S. Cl.
CPC .. *H04L 12/2832* (2013.01); *G05B 2219/2642* (2013.01); *H04L 2012/285* (2013.01)

(56) References Cited

U.S. PATENT DOCUMENTS

| | | | |
|---|---|---|---|
| 9,344,206 | B2 | 5/2016 | Lambourne |
| 9,569,587 | B2 * | 2/2017 | Ansari ............... H04L 9/30 |
| 9,965,047 | B2 * | 5/2018 | Kirkpatrick ........... H05B 45/20 |
| 10,047,971 | B2 | 8/2018 | Nyamjav |
| 2004/0163073 | A1 | 8/2004 | Krzyzanowski |
| 2007/0156857 | A1 | 7/2007 | King |
| 2008/0183651 | A1 | 7/2008 | Hunter |
| 2014/0303788 | A1 * | 10/2014 | Sanders ............... E06B 9/32 700/276 |
| 2015/0082225 | A1 | 3/2015 | Shearer |
| 2015/0355609 | A1 | 12/2015 | Warren |
| 2016/0070244 | A1 | 3/2016 | Cipollo |
| 2016/0073482 | A1 * | 3/2016 | Fok ............... H04L 67/125 315/294 |
| 2016/0224036 | A1 * | 8/2016 | Baker ............... H04W 4/02 |
| 2017/0005818 | A1 | 1/2017 | Gould |
| 2017/0097619 | A1 | 4/2017 | Welingkar |
| 2017/0097621 | A1 * | 4/2017 | Ackmann ......... G05B 19/0426 |
| 2017/0123390 | A1 * | 5/2017 | Barco ............... G05B 15/02 |
| 2017/0315697 | A1 * | 11/2017 | Jacobson ............ H04L 12/281 |
| 2017/0357425 | A1 | 12/2017 | Smith |
| 2018/0005195 | A1 * | 1/2018 | Jacobson ........... G06Q 10/1095 |

FOREIGN PATENT DOCUMENTS

| | | | |
|---|---|---|---|
| FR | 3024811 | A1 | 2/2016 |
| WO | 2005065148 | A3 | 10/2005 |

OTHER PUBLICATIONS

International Preliminary Report on Patentability for PCT/US2017/046269 dated Aug. 28, 2018.

"Accessible Housing by Design—Home Automation". Web Archive dated Jul. 21, 2017, available at: https://web.archive.org/web/20170721095821/https://www.cmhc-schl.gc.ca/odpub/pdf/65889.pdf.

International Search Report and Written Opinion of the International Searching Authority for PCT/US2017/046948 dated Nov. 20, 2017.

Written Opinion of the International Preliminary Examining Authority for PCT/US2017/046948 dated Jul. 24, 2017.

Burger, J., "Semantic database mapping in EUFID", Management of Data, ACM, 2 Penn Plaza, Suite 701 New York NY 10121-0701 USA, May 14, 1980, pp. 67-74, XP058374012.

International Preliminary Report on Patentability for PCT/US2017/046948 completed Oct. 16, 2018.

Jiménez, M. et. al., "Habitation: A Domain-Specific Language for Home Automation Manuel Jiménez, Francisca". In IEEE Computer Society, 2009 IEEE, vol. 26, No. 4, (2009), pp. 30-38.

Ohara, A., "Home App for HomeKit—Hue, August, Ecobee, Automation & Scene creation", YouTube link, published on Nov. 3, 2015. Available at: https://www.youtube.com/watch?v=WLCcdG8qLJA.

Smart Lighting | Intelligent Lighting Control & Lighting Moods For Your Home—Loxone. (n.d.). Retrieved Jan. 10, 2019, from https://www.loxone.com/enen/smart-home/lighting/.

Mobileintsolutions, "MobiLinc and Voice Control: MobiLinc Voice Control Walkthrough". Video published via YouTube on Mar. 3, 2014, retrieved Feb. 4, 2019, from http://mobilinc.com/features/voice/, 40 pages.

Smartscape Automation, "Philips Dynalite Home Automation Welcome Home Scene by Smartscape Automation", YouTube link, published on Nov. 27, 2012. Available at: https://www.youtube.com/watch?v=vYqkzp3xEw0, 37 pages.

Mobileintsolutions, "MobiLinc and Voice Control". (n.d.). Retrieved Feb. 4, 2019, from http://mobilinc.com/features/voice/, (2014), 6 pages.

\* cited by examiner

SYSTEM AND METHOD FOR UTILIZATION OF DEVICE-INDEPENDENT SCENES IN A SMART HOME ENVIRONMENT

CROSS-REFERENCE TO RELATED APPLICATIONS

The present application is a national stage application under 35 U.S.C. 371 of International Application No. PCT/US2017/046269, entitled SYSTEM AND METHOD FOR UTILIZATION OF DEVICE-INDEPENDENT SCENES IN A SMART HOME ENVIRONMENT, filed on Aug. 10, 2017, which claims benefit under 35 U.S.C. § 119(e) from U.S. Provisional Patent Application Ser. No. 62/377,206, filed Aug. 19, 2016, entitled "System and Method for Utilization of Device-Independent Scenes in a Smart Home Environment," which is incorporated herein by reference in its entirety.

BACKGROUND

Environments containing a variety of devices and/or services that are remotely controllable have increased in number and complexity. Some example devices include lighting, window shades, alarm systems, home entertainment systems, houseplant and yard watering, heating, ventilating, and air conditioning (HVAC) controls, and the like. Homes are environments that have experienced such increases, and homes containing these devices and/or services are sometimes referred to as "smart homes" or "automated homes." To assist users in the use and configuration of these devices and/or services, scenes are created. The scenes define a collection of devices and the states of the different devices. For example, one scene in a home may turn off some lights, set particular lighting levels on other lights, and turn on the home theater system. Another scene may be used when the residents are away, and the lights may be turned on or off at certain specified periods of time. In yet another scene, the front door security camera starts recording whenever the front doorbell or a motion sensor near the front door is activated. Generally, the scenes are created at the time of installation of the devices and/or services by a professional installer. Home automation platforms control the devices according to the different scene settings.

SUMMARY

Systems and methods described herein allow for the use of home automation scenes that are independent of particular home and independent of particular device in those homes. According to exemplary systems and methods, home automation scenes can be developed without regard to the layout or equipment available in any particular home, and those scenes can then be adapted for use in particular homes with particular configurations of devices.

In an exemplary method, (a) a home automation system associated with a particular designated home receives information regarding a home-independent home automation scene, where the information identifies (i) a zone property, and (ii) an identified zone type. The system identifies, in the designated home, a location corresponding to the identified zone type. For example, a table may be provided during setup of the home automation system that identifies the zone type of each room (or other division) of the home. The system identifies, in the designated home, a plurality of automation devices capable of affecting the zone property, which may also be referred to as a target state or zone target state, in the identified location. For example, the zone property may have a parameter that indicates whether the zone property relates to temperature, illumination, security, or the like. A table or other data stored for the designated home may associate each device with a corresponding parameter (e.g. automated lights or window shades may be associated with an illumination parameter, and a heating/cooling system may be associated with a temperature parameter). Each device may also be associated with one or more parameters indicating rooms (or other zones) in which the device is effective. For example, an automated lamp may be associated with a single room (e.g. in which the lamp is located), while a central heating unit may be associated with several rooms. For each of the identified devices, the system identifies an action of the respective device that contributes to the zone property or target state (such as an action of turning a light on or off, or opening or closing a window shade). The system then stores a home-automation scene for the designated home, where the home-automation scene includes information identifying the plurality of identified devices and the respective identified actions of those devices. In response to user selection of the stored home-automation scene, the home automation system causes the identified devices to perform the respective identified actions.

In some embodiments, the steps described above are repeated for each of a plurality of home-independent home automation scenes to configure the home automation system for use of those scenes in a designated home. In some embodiments, a home automation system operates to configure scenes on a room-by-room basis, configuring in turn each scene that corresponds to the respective room.

A further embodiment takes the form of a method comprising receiving a request to activate a device-independent scene, the device-independent scene having a zone and a state; transmitting a discovery request to a plurality of home automation devices; receiving a plurality of discovery responses from a plurality of the home automation devices, each of the discovery responses including a home automation device type and location; determining a set of home automation devices located with the zone and transmitting the set to a mapping database; receiving, from the mapping database, a set of action instructions, wherein the actions correspond to implementing the requested state for the zone; and transmitting to the respective home automation devices, the respective action instructions, wherein each of the home automation devices responsively operates in accordance with the received instructions.

DETAILED DESCRIPTION

Generally, a home automation platform allows a user to control and configure various devices within a home. Each of the devices is communicatively coupled with the home automation system, either wirelessly (e.g.; WiFi, Bluetooth, NFC, optically, and the like) or wired (e.g.; Ethernet, USB, and the like). The home automation platform is able to receive user inputs for user selected scenes, and provides operational instructions to the devices to implement the selected scene.

The home automation platform is able to receive the user inputs through a user interface (UI). One example of a UI is a speech-based UI, which, in part, allows the user to interact with the home automation platform with the user's voice (e.g., allows for speech-driven control of the device). For example, the user may interact with the home automation platform by speaking an instruction to the speech-based UI associated with the home automated platform (e.g., embedded in the device, connected to the device), and based on the spoken instruction (e.g., based on the words and/or phrases in the spoken instruction), the device may execute an action corresponding to the instruction. For example, based on the spoken instruction, the home automation platform may execute an action such as communicating with a device and/or a service, controlling a device and/or a service (e.g., transmitting control commands to a device and/or a service), configuring a device and/or a service, connecting to and/or disconnecting from a device and/or a service, receiving information, requesting information, transmitting information, transitioning a device to a target device state, and/or any other suitable action. Other example UIs include a user interacting with a smart phone or computer application that is communicatively coupled to the home automation platform or with a set of buttons on a control panel.

Some speech control devices, and specifically multi-user speech devices such as the Amazon Echo, are increasing in popularity for use in smart-home control. For example, in a smart-home, occupants in a home may issue spoken commands to a speech control device (e.g., a multi-user speech device such as the Amazon Echo® or the 4$^{th}$ generation Apple TV® and/or to a personal device, such as a mobile phone) which may then parse these commands and/or issue control messages over a network to configure smart home devices or other services into a desired state (e.g., turning lights on and/or off; playing movies, music, and/or or other content, etc.). Multi-user speech devices as home-automation controllers (smart-home hubs) may be increasing in popularity since these devices, for example, may provide a centralized, always-listening, whole-home speech-based UI that may be used any occupant at the home at any time. Moreover, in addition to UI functionality, these multi-user speech devices may serve as a central point of control for connecting with other devices in the home and/or cloud-based services.

Traditionally, developing different scenes has been a detailed process requiring a professional technician to program the home automation platform with technical details of each connected device and status of each device for the different scenes. The technical details may include different operating modes, such as light intensity and/or color for a light bulb (e.g.; a scene related to brightening a room may require a Phillip Lighting light bulb be set to a brightness of "1.0" and a hue of: 0xff68a9ef). In some embodiments, other semantically similar devices may also accomplish the overall desired state of brightening a room. For example, the results of the desired scene, a brightened room, may be accomplished by a home automation platform issuing instructions to a motorized window blind to open the blinds on a window.

In contrast to a traditional device specific scene, a device-independent scene described at a high level is more flexible and robust. For example, if a home lighting device breaks and needs to be replaced, the traditional device-specific scene would need to be updated by a user, or professional installer, to reflect that the home lighting device is non-operational. However, in a device-independent scene, alternative devices may be used to accomplish the end goal of the requested scene. A device-independent scene may be developed based on querying a mapping database with all available devices and/or services and the requested scene to receive all possible instructions to affect the scene. This allows for sharing of scene specifications from individual home automation platforms since scenes can adapt to the specific set of devices present at a new location and incorporation of new devices each time a scene is requested because the home automation platform determines all available devices each time a scene is requested.

Thus, it may be beneficial and desirable to specify scenes on a higher level, a level that is device independent, in which the overall state for a given region in a home is defined, rather than hard-coded with specific sets of instructions for individual devices and operations. Such a device-independent scene representation is adaptable to the addition, removal, and malfunction of devices and is more flexible in terms of devices available to achieve a scene's desired results.

Systems and methods disclosed herein may operate to create and implement device-independent scenes in terms of a zone, which is a region of the building or home, and a desired state of the zone. When a scene is requested, the home automation platform determines a set of devices or services that are able to be controlled by the home automation platform, and queries a mapping database with the set of devices or services in the requested zone and the requested state of the zone. The home automation platform receives a list of instructions from the mapping database for each device or service in order effect the end state of the requested scene. The home automation platform provides the instructions to each of the devices and services, and the devices and services operate in accordance with the received instructions.

The mapping process is facilitated by a repository of data that correlates how a particular high-level state (such as 'brighter', 'darker', 'warmer', 'cooler', 'secure', 'breezy', and so forth) is able to be mapped onto a wide range of specific device types and specific operations on those types of devices. The mapping database may be implemented using any store of data usable for performing the mapping from the device-independent scenes to device-specific instances and operations.

Figure 1:
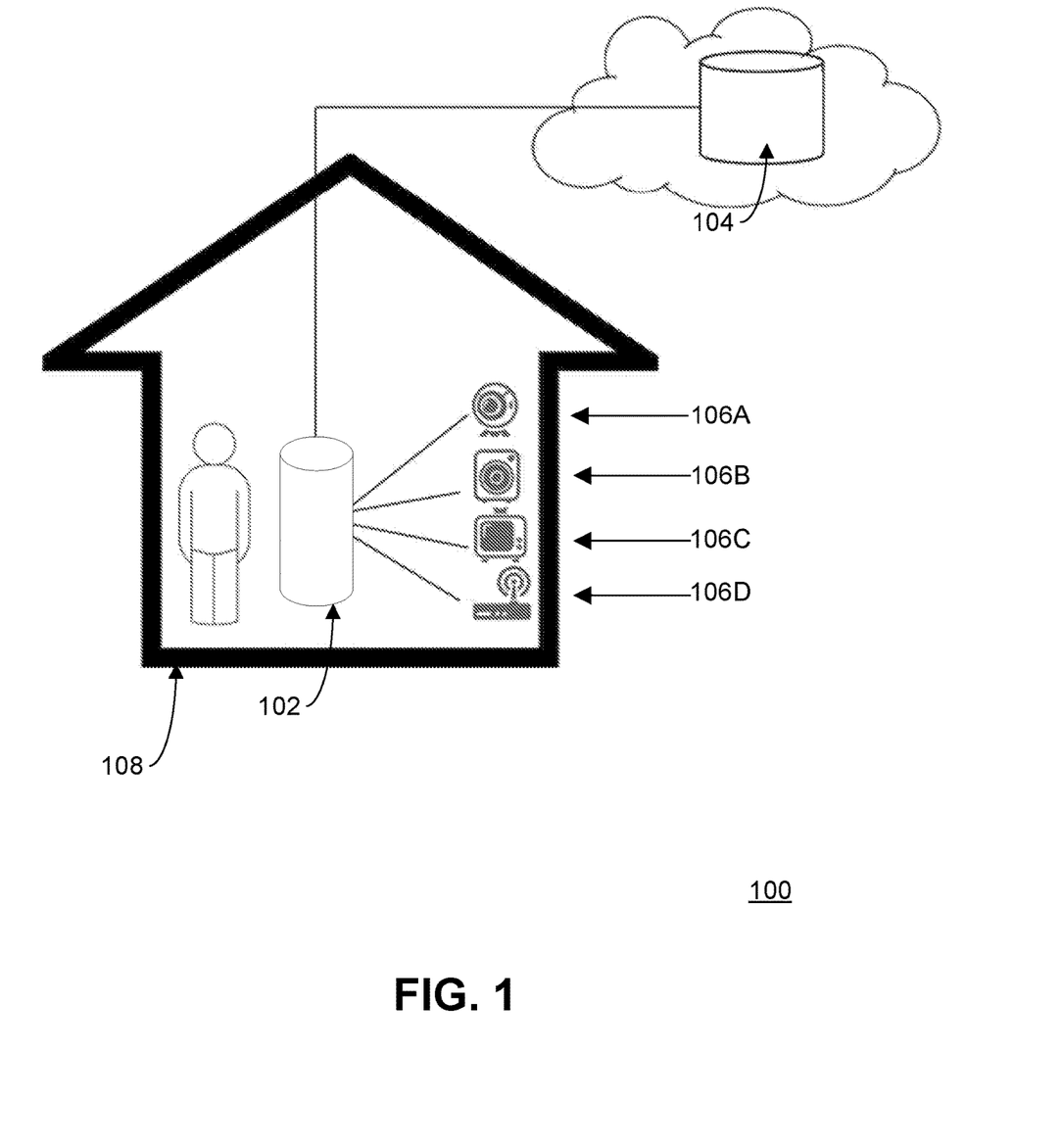
FIG. 1 is a schematic diagram of a home automation platform in accordance with some embodiments.

FIG. 1 is a schematic diagram of an example system including a home automation platform for device-independent scenes, in accordance with some embodiments. The example system 100 includes a home automation platform 102, a mapping database 104, home automation devices 106A-D, and a building 108. In some embodiments, the system 100 may include other components not combined or included in those shown in FIG. 1 (e.g., communications circuitry, a network gateway, a network interface controller, a power supply, or a bus), or multiple instances of the components shown in FIG. 1. For the sake of simplicity, only one of some of the components are shown in FIG. 1.

As shown in FIG. 1, the system 100 may include any number of the devices 106A-D, with 106A being a security camera, 106B being a speaker, 106C being a television, and 106D being a home security system, although any number of different devices or services may be used. The devices 106A-D are able to be discovered by and communicatively coupled to the home automation platform 102. Each of the devices 106A-D is able to be controlled by receiving operational instructions from the home automation platform 102.

The home automation platform 102 acts as a scene controller. Example home automation platforms that may be configured to perform the teachings of this disclosure include an Amazon Echo®, an ivee Voice, a Google Home®, a personal computer, and the like. The home automation platform 102 is communicatively connected to the mapping database 104 and is configured to query the mapping database 104 with a list of available devices 106A-D and the desired state of the zone in order to obtain information used to implement the requested device-independent scene with specific device operational instructions.

As shown in FIG. 1, the home automation platform 102 may be connected to the devices 106A-D and the mapping database 104. The home automation platform 102 may communicate wirelessly or through a wired connection to the components of the system 100. For example, in some embodiments, the home automation platform may wirelessly communicate with the device 106A (e.g., via Bluetooth) and 106B (e.g., via Wi-Fi), and/or the home automation platform 102 may communicate both wired and wirelessly (e.g., wirelessly via a Wi-Fi connection to a home router, and wired via an Ethernet cable to a modem to connect to the mapping database 104 located on a remote network) to the mapping database 104.

Figure 2:
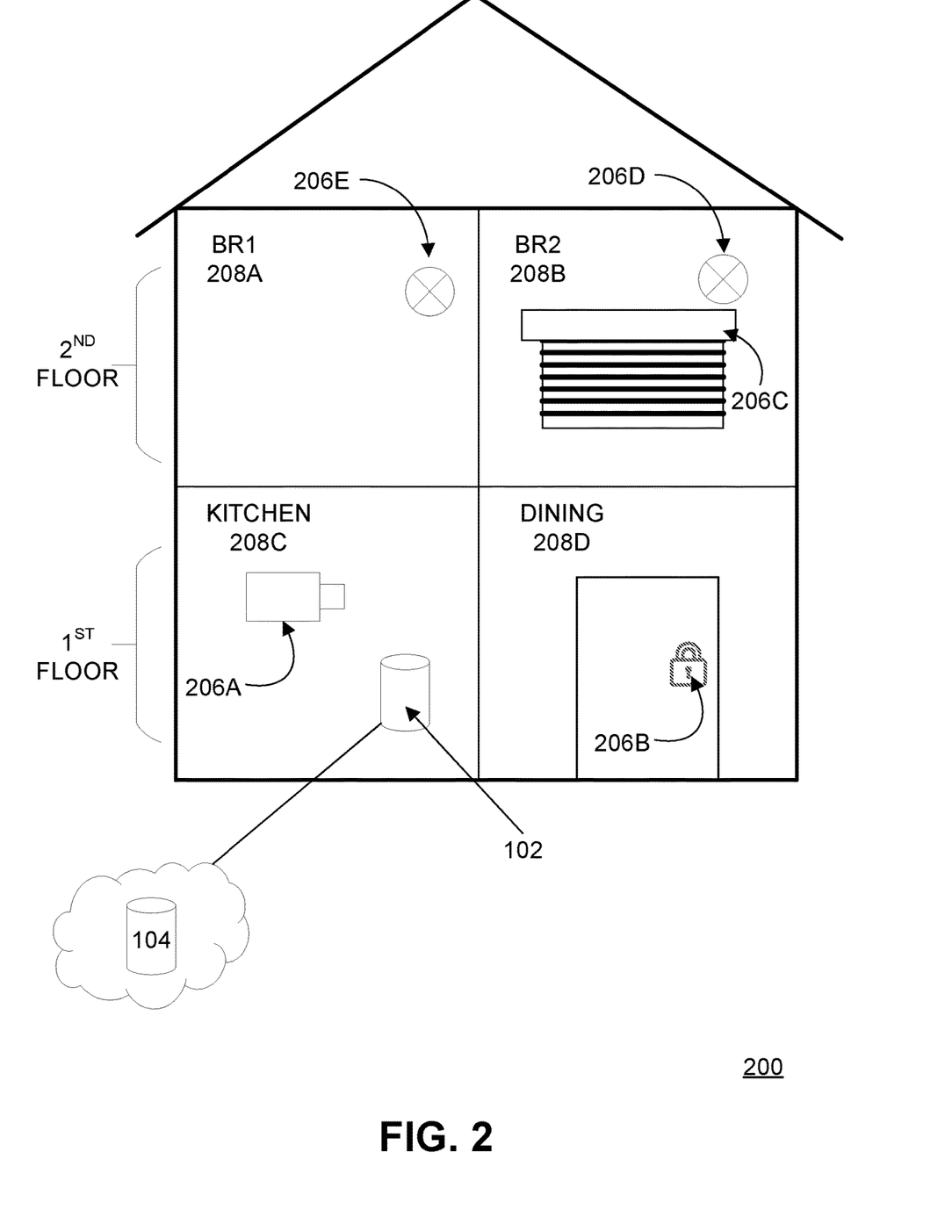
FIG. 2 is a schematic diagram of different zones in a home automation system in accordance with some embodiments.

FIG. 2 is a schematic diagram of different zones in a home automation system in accordance with some embodiments. The diagram 200 depicts a home equipped with a home automation platform and various home automation devices and services throughout the home. In particular, the home includes components from FIG. 1, including the home automation platform 102 in communication with the mapping database 104. The home has a first floor with a kitchen 208C and a dining room 208D and a second floor with a first bedroom 208A and a second bedroom 208B. Similar to the devices 106A-D, the home in the diagram 200 includes devices 206A-E throughout the home, each of the devices 206A-E is configured to be communicatively coupled to the home automation platform 102. The devices and services 206A-E include a camera 206A located in the kitchen 208C, a smart door lock 206B located in the dining room 208D, a smart window shade 206C and a light 206D located in the second bedroom 208D, and a light 206-E located in the first bedroom 208A.

In some embodiments, the requested scene comprises information identifying both a zone and a state. A "zone" may also be referred to as a region of the home to which the scene is intended to apply. The zones may be listed as a character string and may be a single room (e.g., 'bedroom', such as Bedroom 1 208A), a set of rooms (e.g., 'bedrooms', such as both Bedroom 1 208A and Bedroom 2 208B; or 'first floor' such as the Kitchen 208C and the Dining Room 208D), or the 'whole home' (e.g., such as Bedroom 1 208A, Bedroom 2 208B, Kitchen 208C, and the Dining Room 208D).

A "state" is the desired result which the user intends to apply to the zone. The state may similarly be expressed as a human-readable string, such as 'dark,' 'light,' 'darker,' 'lighter,' 'secure', and so forth. The scene may be expressed as "Zone: State", for example, "Bedrooms: Dark" or "Home: Secure", or "Dining Room: Warmer".

Table 1 depicts data in a mapping database table in accordance with some embodiments.

TABLE 1

Device-State Mapping Database

| Device-Independent State | Device Type | Action | Parameter |
| --- | --- | --- | --- |
| Light | Philips Hue Lights | On | |
| Light | Serena Shades | Raise | |
| Light | Lutron Smart Blinds | Open | |
| Brighter | Philips Hue Lights | Increase | +0.25 |
| Warmer | Nest Thermostat | Increase Temp | 2.0 Degrees |
| Secure | August Door Lock | Armed | |
| Secure | Logitech Camera | Recording | |
| Secure | Lutron Motion Detector | Armed | |
| ... | ... | ... | |

When a device-independent scene is activated, a mapping process is performed by the home automation system to configure applicable devices and services to the activated scene. The mapping database depicted in Table 1 is a relational database. The database includes a device-independent state, a device type, an action for the device type, and optionally a device-operating parameter. The device-independent state includes the names of allowable states in the device-independent scene specifications. Specific types of devices are related to the device-independent state. For example, as shown in Table 1, the specific devices associated with the "light" state are Philips Hue Lights, Serena Shades, and Lutron Smart Blinds. The specific devices associated with the "secure" state are August Door Locks, Logitech Cameras, and Lutron Motion Detectors. The device associated with the "warmer" state is a Nest thermostat. While the mapping database of Table 1 includes general names of device types, the names may also include specific model numbers, firmware updates, and the like.

The mapping database depicted in Table 1 also includes action instructions for the device type to affect the desired state for the scene. For example, to satisfy the device-independent state of "light", the Philips Hue Lights should receive an "on" instruction, the Serena Shades should receive the "raise" instruction, and so on. Similar to the state of "light", the mapping database of Table 1 may also include a "dark" state, and the action for the Philips Hue Lights would be "Off", the action for the Serena Shades would be "Lower", and so on. The table maps the light-level desired state into specific sets of instructions for individual device types.

In some embodiments, the mapping process includes linking to external information sources to determine the effectiveness of the device actions in implementing the scene. For example, the mapping process may also include querying the sunrise and sunset times in the geographical location of the home. Provided the extra information about sunset, the home automation system may be able to determine that lowering blinds after sunset may not make a room darker, whereas lowering blinds during the day may make the room darker. In another embodiment, the external information includes weather information, such as if it is sunny or overcast, in the geographical location of the home and device instructions are dependent on the weather information.

In some embodiments, the actions are parameterized, such that the parameter data provides for additional parameters for the device instructions. For example, the "brighter" state corresponds to an "increase" action for the Philips Hue Lights with a "+0.25" parameter. The "+0.25" parameter provides additional instructions for the magnitude of brightness that the Philips Hue Lights should increase by to affect the "brighter" state.

The mapping database of Table 1 is but one schema, as another mapping schema are also possible. For example, indirect mappings, such that the device-independent state of "Light" is first mapped to device categories that might be impact the desired state, such as "Lights," "Shades," and "Blinds," and then a separate table contains all known types of each of the categories.

Figure 3:
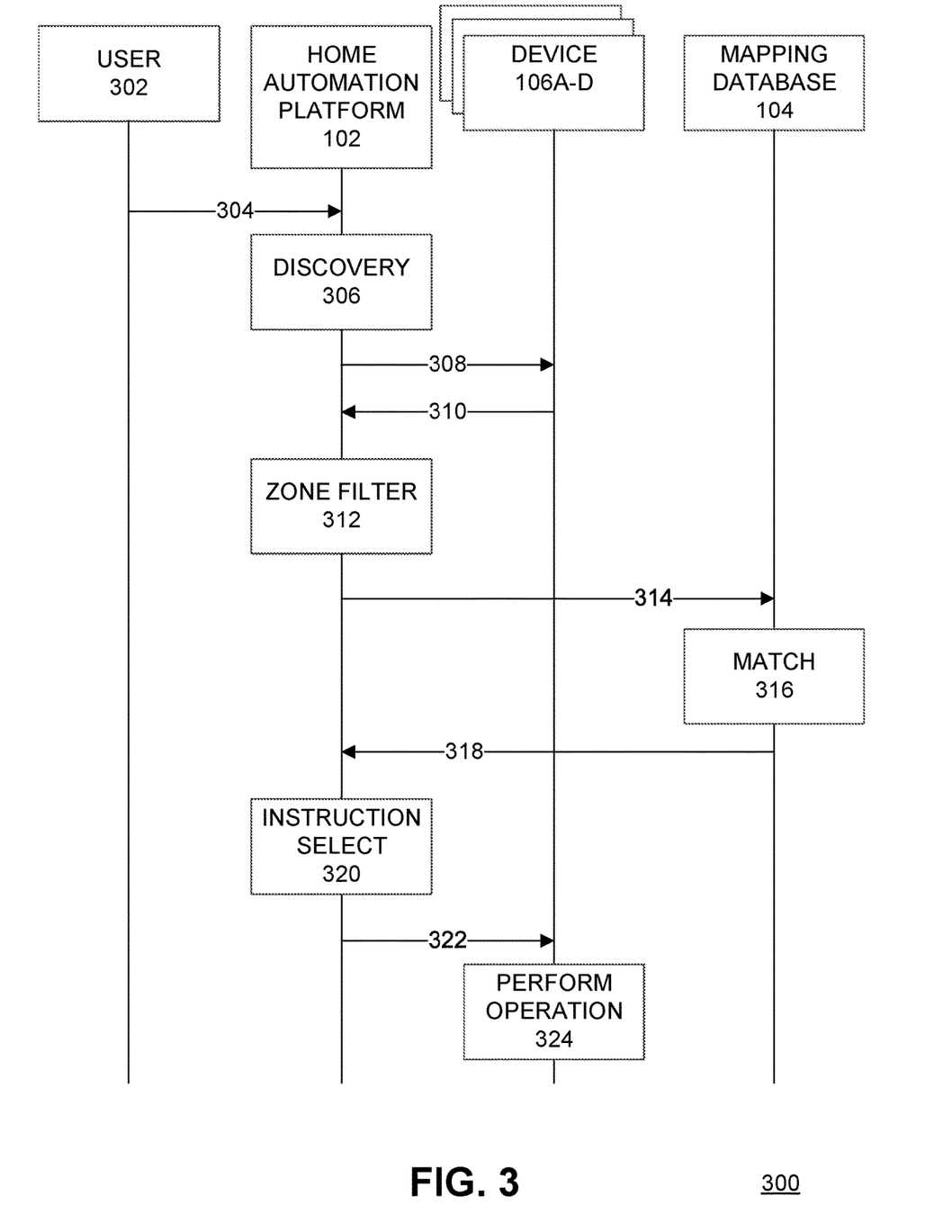
FIG. 3 depicts a flow diagram, in accordance with some embodiments.

FIG. 3 depicts a flow diagram in accordance with some embodiments. In particular, the FIG. 3 depicts the flow diagram 300 that includes a user 302, the home automation platform 102, the devices 106A-D, and the mapping database 104.

In the flow diagram 300, at 304 the user 302 requests to the home automation platform 102 a scene, that includes a zone Z and a state S, to be activated. While the flow diagram 300 depicts the user 302 requesting the scene, the scene may be activated by a schedule or some other trigger, such as an event from a device 106A-D.

At 306, the home automation platform 102 commences a discovery of all devices connected to the home network and produces a set of available devices D. To perform the discovery 306, the home automation platform 102 transmits the discovery request 308 to each of the devices 106A-D and receives a discovery response 310 from each of the devices 106A-D. The discovery response 310 may also include a location attribute describing which region of the home the device is located. The location attribute may be entered manually or may be determined automatically using a discovery protocol. At 312, the home automation platform 102 filters the set D to the devices 106A-D that are within the scene's zone Z, resulting in the set $D_z$ of devices 106A-D that are within the zone Z.

At 314, the home automation platform 102 provides the mapping database 104 with the set $D_z$ and the requested state S. At 316, the mapping database 104 matches the devices of the set $D_z$ with the requested state S and determines a set of tuples, one for each specific device type, corresponding action, and parameter, $M=\{T_S, A_S, P_S\}$, where $T_S$ represents the specific device type for the state, $A_S$ represents the action for that device type, and $P_S$ represents the parameter for the operation, if present. At 318, the matching database 104 provides the matched information to the home automation platform 102. At 320, for each specific device D remaining in the set $D_z$, the device type of the device D is determined, called $T_d$; for each tuple in the set of mapping tuples M, if $T_d=T_S$, then invoke actions $A_S$ on device D providing parameters $P_S$ by transmitting the instructions to the respective device 106A-D at 322 and each device 106A-D operates in accordance with the received instructions at 324.

In an example use case based on a combination of the embodiments illustrated in the schematic diagram of FIG. 2 and the flow diagram of FIG. 3, a user activates a desired device-independent scene (304). For example, a user may request that "Bedroom 2" (BR2 208B of FIG. 2) be the state of "dark", with the character string of the scene as: "Bedroom 2: Dark". The home automation platform performs device discovery (306) and transmits to all devices 206A-E a discovery request (308). The discovery request may be transmitted by any means, such as Bluetooth, multicast-DNS, or other common discovery protocols. Each of the devices 206A-E that received the discovery request provide a discovery response (310) to the home automation platform 102. The home automation platform 102 compiles a set of all connected devices, and the set of available devices D includes the camera 206A, the smart door lock 206B, the smart window shades 206C and the lights 206D-E. The response may also include location information for each of the devices.

The home automation platform 102 filters (312) the set D to determine the devices that are within the region of the zone "Bedroom 2" based on received location information, that results in the smart set $D_z$ that includes the window blinds 206C and the light 206D. At 314, the home automation platform 102 sends the set $D_z$ (having 206C and 206D) and the requested state S (Dark), to the mapping database 104 to determine which devices are able to be operated to implement the requested scene. The mapping database 104 matches (316) the device types to actions in the relational database and determines that the smart blinds 206C action $A_S$ is "Lower", and the light 206D action $A_S$ is "Off". In this example use case, no parameters $P_S$ are used. If additional devices not related to the state of "Dark" were in the set $D_z$, such as a ceiling fan or a speaker, no actions would be returned for those devices. Each of the devices in $D_z$ are checked against the mapping database 104, and a list of devices, instructions, and parameters for the scene are provided to the home automation platform 102 (318). The home automation platform 102 then selects instructions (320) and provides each device (322) with the operation instructions. In this use case, the smart blinds 206C receive instructions to lower and the light 206D receives instructions to turn off. The smart blinds 206C receive the instructions and responsively lowers and the light 206D receives instructions and responsively turns off (324).

In the disclosed embodiments, the mapping database contains information to translate from a device-independent state to a specific set of operations on a specific set of devices. Maintaining the mapping may require human input, as a computer may not have information indicating that a sting denoting the action operation "On" and a string identifying a device type "Philips Hue Lighting" is semantically a way to "light" a room. Further, the strings representing device types are ever-expanding as new types of devices appear as new smart home devices are manufactured.

In one embodiment, the mapping database is maintained by one or more users or organizations tasked with maintaining the database. For example, a vendor or a standards organization, or a third-party cloud service may maintain the mapping database and update it regularly as new device types appear on the market. Some mapping databases may be vendor specific, for example, Company A may add "Company A Device" compliant translations to their database as part of their "Company A Device" certification process for vendors' new products; such a vendor-specific mapping database might be seen as a value-add to incentivize the purchase of "Company A Device" compliant products and also provide value to vendors in return for "Company A Device" licensing and certification fees.

In another embodiment, the mapping database's contents are crowdsourced. In this method, users are encouraged to give "generic" names to their scenes through a user interface they use to control their home automation. Such high-level scene names can be compared across homes, and common device types and operations are identified that share high-level descriptors. For example, many users may choose the name "Warmer" for a scene, and their corresponding actions may be extracted and added to a mapping database to provide translation features to all users. In this process, multiple users spread over many households are effectively telling the system which devices should be used together, and are equivalent to each other.

In some embodiments, it is advantageous to store the mapping database information centrally, or remotely, so that it can be maintained and updated. In such an embodiment, each home automation platform queries a cloud-based mapping database each time a scene is activated. This permits new device type entries to be flexibly added, and all homes to benefit from centralized, automatic updates to the mapping database. In some embodiments, subsets or even the entire mapping database may be cached locally within the home to speed up operations and minimize data transfer.

In some embodiments, the zone name includes flexibility. The home automation platform requires devices within the zone that are able to operate to implement the desired state. For example, to activate a scene "Keith's Office: Dark", the home automation platform would need a response from a device in Keith's Office that is capable of affecting the "Dark" state.

The flexibility in zone names is provided when the names for zones do not correspond exactly to the specific room a device is located. Some examples include "Home" (which captures all devices in the house), "First Floor" (which captures devices located in rooms on the first floor), or "Bedrooms" (which captures "Sally's Bedroom," "Bobby's Bedroom," and "Master Bedroom"). The location information is stored such that each device does not have multiple hard-coded location attributes for every possible combination of ways to refer to a location. In one embodiment, a locations database is maintained, either separately or as a part of the matching database. The locations database maintains mappings between high-level zone names (such as "Home," "First Floor,", or "Bedrooms") and the specific per-room location attributes on individual devices. The locations database is queried during location filtering (312) to include devices whose location in the locations database is included within the higher-level zone name.

In such an embodiment, based on the zone Z of the device-independent scene, all locations in the location database that correspond to zone Z are denoted as a set of valid locations: $L=\{l_1, l_2, l_3, \ldots\}$ Then, D is filtered to contain only those devices with location attributes that match any location in the set L that corresponds to the zone Z, called $D_Z$. In other words, $D_Z$ includes only those devices that are physically present in the named zone. The data in the locations database may be generated automatically. For example, the high-level zone name "Home" includes all discoverable devices, and "Bedrooms" includes the complete set of location names that include the string "Bedroom". In some embodiments, the user is prompted to provide high-level zone names that the system is unable to determine by itself. For example, the system may present a question via a user interface to the user requesting, "Which of the following locations are on the First Floor?" and create a new "First Floor" high-level zone name based on that.

In some embodiments, the mapping database (and locations database) are stored on the user's home network instead of a centralized cloud. In some embodiments, the databases are explicitly maintained instead of crowd sourced. In some embodiments, a plurality of mapping databases exists, with a separate mapping database for each device vendor. In some embodiments, the mapping database is a single universal mapping database.

In one embodiment, the translation from device-independent specifications to device-dependent actions, occurs each time a scene is activated. The specialization allows for adoption of new devices by the scene each time it is run, and so there is no need to explicitly update device lists or scene definitions. Such a process may be more computationally expensive, an alternative has the home automation platform initialize a scene for the first time it is brought into the home. In this embodiment, the scene specialization process would only occur once unless explicitly re-run by the user, meaning that new devices would not automatically be detected. Thus, the home automation device types and zones may be stored in a local storage cache for use in subsequent scene implementations.

In some embodiments, a user may not wish for a particular device or set of devices to be included in a scene, or may even desire for other devices, not explicitly captured by the scene, to be included in a given device-independent scene. In such an embodiment, a customized scene where users can forcibly include or exclude particular devices to the scene may be developed. For example, a user may wish to "darken" the bedroom by turning off the lights but wants to maintain the blinds open such that the room becomes light when the sun rises in the morning. The customizations may be stored in a list of explicitly included and excluded devices (and related operations for included devices) for each device-independent scene. The lists are added to or removed from the filtered device set (312) for each device-independent scene.

In another use case, device-independent scene states may be enabled by the device-specific operations as listed in Table 2.

TABLE 2

Example Device-Specific Operations for Scene States.

| Device-Independent Scene State | Example Device-Specific Operations |
|---|---|
| Light | Lights.on( ), shades.open( ), blinds.raise( ) |
| Dark | Lights.off( ), shades.close( ), blinds.lower( ) |
| Brighter | Lights.brighten(+0.25), blinds.raise(0.25) |
| Darker | Lights.dim(−0.25), blinds.lower(0.25) |
| Secure | Doors.close( ), locks.enable( ), camera.on( ), motionDetector.on( ), alarm. arm( ) |
| Warmer | Thermostat.increase(2.0), registers.open( ), windows.close( ) |
| Cooler | Thermostat.decrease(2.0), registers.open( ), windows.close( ) |
| Breezy | Fan.on( ), window, open ( ), hvac.shutOff( ) |

Figure 4:
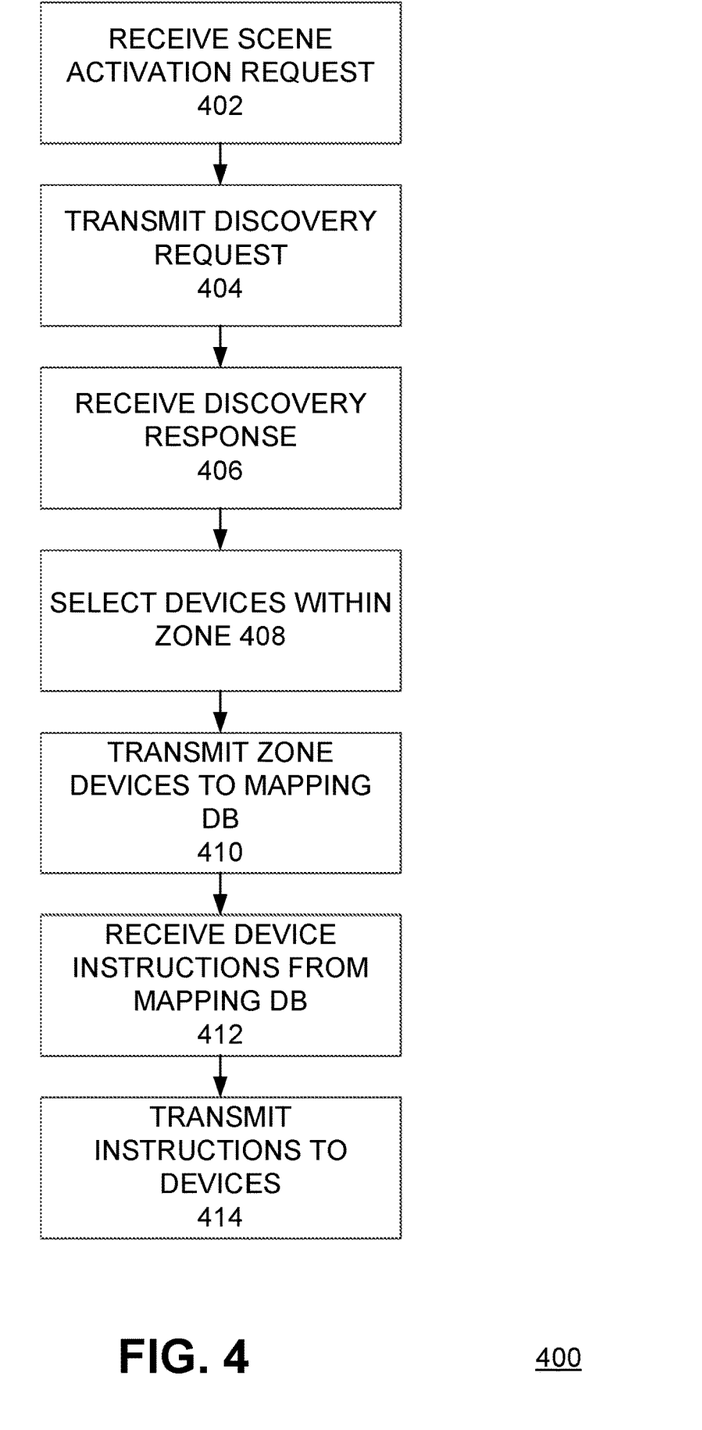
FIG. 4 depicts an example method, in accordance with some embodiments.

FIG. 4 depicts an example method, in accordance with an embodiment. In particular, FIG. 4 depicts the method 400 that includes the home automation platform receiving a request to activate a device-independent scene having a zone and a state at 402, the home automation platform transmitting a discovery request to connected devices at 404, receiving a discovery response having device type and location information from the connected devices at 406, selecting devices within the zone at 408, transmitting to a mapping database a list of devices within the zone at 410, receiving from the mapping database action instructions, wherein the actions are to be performed by each of the respective devices at 412, and transmitting to the devices, the respective action instructions at 414.

Figure 5:
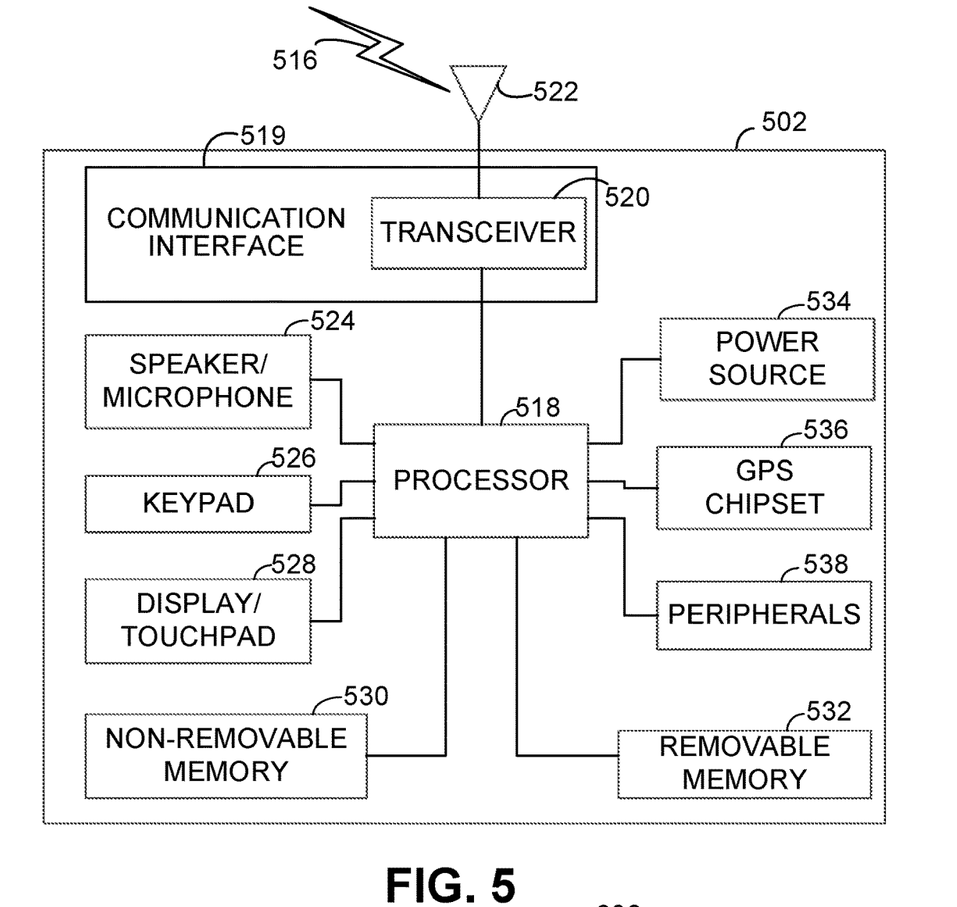
FIG. 5 is an exemplary wireless transmit/receive unit (WTRU) that may be employed as a device and/or home automation platform in embodiments described herein.

FIG. 5 is a system diagram of an exemplary wireless/transmit receive unit (WTRU) 502, which may be employed as a device and/or home automation platform in embodiments described herein. As shown in FIG. 5, the WTRU 502 may include a processor 518, a communication interface 519 including a transceiver 520, a transmit/receive element 522, a speaker/microphone 524, a keypad 526, a display/touchpad 528, a non-removable memory 530, a removable memory 532, a power source 534, a global positioning system (GPS) chipset 536, and sensors 538. It will be appreciated that the WTRU 502 may include any sub-combination of the foregoing elements while remaining consistent with an embodiment.

The processor 518 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 518 may perform signal coding, data processing, power control, input/output processing, and/or any other functionality that enables the WTRU 502 to operate in a wireless environment. The processor 518 may be coupled to the transceiver 520, which may be coupled to the transmit/receive element 522. While FIG. 5 depicts the processor 518 and the transceiver 520 as separate components, it will be appreciated that the processor 518 and the transceiver 520 may be integrated together in an electronic package or chip.

The transmit/receive element 522 may be configured to transmit signals to, or receive signals from, a base station over the air interface 516. For example, in one embodiment, the transmit/receive element 522 may be an antenna configured to transmit and/or receive RF signals. In another embodiment, the transmit/receive element 522 may be an emitter/detector configured to transmit and/or receive IR, UV, or visible light signals, as examples. In yet another embodiment, the transmit/receive element 522 may be configured to transmit and receive both RF and light signals. It will be appreciated that the transmit/receive element 522 may be configured to transmit and/or receive any combination of wireless signals.

In addition, although the transmit/receive element 522 is depicted in FIG. 5 as a single element, the WTRU 502 may include any number of transmit/receive elements 522. More specifically, the WTRU 502 may employ MIMO technology. Thus, in one embodiment, the WTRU 502 may include two or more transmit/receive elements 522 (e.g., multiple antennas) for transmitting and receiving wireless signals over the air interface 516.

The transceiver 520 may be configured to modulate the signals that are to be transmitted by the transmit/receive element 522 and to demodulate the signals that are received by the transmit/receive element 522. As noted above, the WTRU 502 may have multi-mode capabilities. Thus, the transceiver 520 may include multiple transceivers for enabling the WTRU 502 to communicate via multiple RATs, such as UTRA and IEEE 802.11, as examples.

The processor 518 of the WTRU 502 may be coupled to, and may receive user input data from, the speaker/microphone 524, the keypad 526, and/or the display/touchpad 528 (e.g., a liquid crystal display (LCD) display unit or organic light-emitting diode (OLED) display unit). The processor 518 may also output user data to the speaker/microphone 524, the keypad 526, and/or the display/touchpad 528. In addition, the processor 518 may access information from, and store data in, any type of suitable memory, such as the non-removable memory 530 and/or the removable memory 532. The non-removable memory 530 may include random-access memory (RAM), read-only memory (ROM), a hard disk, or any other type of memory storage device. The removable memory 532 may include a subscriber identity module (SIM) card, a memory stick, a secure digital (SD) memory card, and the like. In other embodiments, the processor 518 may access information from, and store data in, memory that is not physically located on the WTRU 502, such as on a server or a home computer (not shown).

The processor 518 may receive power from the power source 534, and may be configured to distribute and/or control the power to the other components in the WTRU 502. The power source 534 may be any suitable device for powering the WTRU 502. As examples, the power source 534 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 518 may also be coupled to the GPS chipset 536, which may be configured to provide location information (e.g., longitude and latitude) regarding the current location of the WTRU 502. In addition to, or in lieu of, the information from the GPS chipset 536, the WTRU 502 may receive location information over the air interface 516 from a base station and/or determine its location based on the timing of the signals being received from two or more nearby base stations. It will be appreciated that the WTRU 502 may acquire location information by way of any suitable location-determination method while remaining consistent with an embodiment.

The processor 518 may further be coupled to other peripherals 538, which may include one or more software and/or hardware modules that provide additional features, functionality and/or wired or wireless connectivity. For example, the peripherals 538 may include sensors such as an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 6:
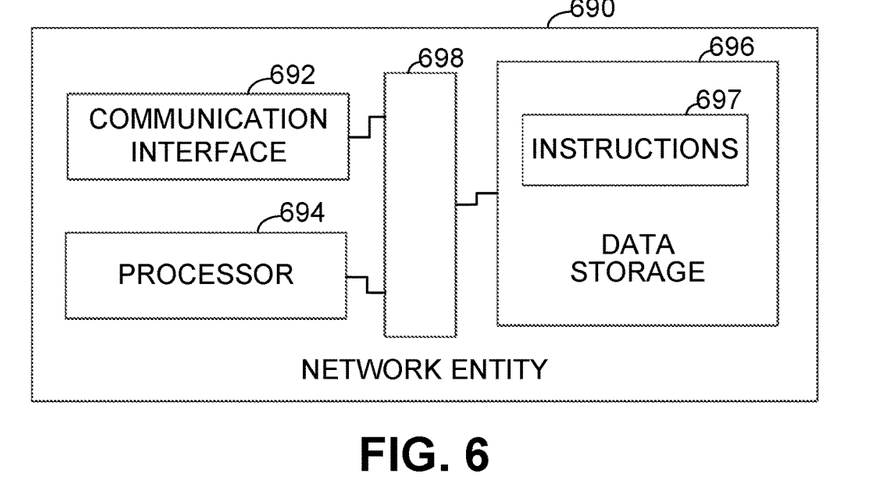
FIG. 6 is an exemplary network entity that may be employed as a device and/or home automation platform in embodiments described herein.

FIG. 6 depicts an exemplary network entity 690 that may be used in embodiments of the present disclosure, for example as an exemplary communications device, mapping database, and the like. As depicted in FIG. 6, network entity 690 includes a communication interface 692, a processor 694, and non-transitory data storage 696, all of which are communicatively linked by a bus, network, or other communication path 698.

Communication interface 692 may include one or more wired communication interfaces and/or one or more wireless-communication interfaces. With respect to wired communication, communication interface 692 may include one or more interfaces such as Ethernet interfaces, as an example. With respect to wireless communication, communication interface 692 may include components such as one or more antennae, one or more transceivers/chipsets designed and configured for one or more types of wireless (e.g., LTE) communication, and/or any other components deemed suitable by those of skill in the relevant art. And further with respect to wireless communication, communication interface 692 may be equipped at a scale and with a configuration appropriate for acting on the network side—as opposed to the client side—of wireless communications (e.g., LTE communications, Wi-Fi communications, and the like). Thus, communication interface 692 may include the appropriate equipment and circuitry (perhaps including multiple transceivers) for serving multiple mobile stations, UEs, or other access terminals in a coverage area.

Processor 694 may include one or more processors of any type deemed suitable by those of skill in the relevant art, some examples including a general-purpose microprocessor and a dedicated DSP.

Data storage 696 may take the form of any non-transitory computer-readable medium or combination of such media, some examples including flash memory, read-only memory (ROM), and random-access memory (RAM) to name but a few, as any one or more types of non-transitory data storage deemed suitable by those of skill in the relevant art could be used. As depicted in FIG. 6, data storage 696 contains program instructions 697 executable by processor 694 for carrying out various combinations of the various network-entity functions described herein.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method of adapting a home-independent home automation scene to a designated home, the method comprising:
receiving information regarding a home-independent home automation scene, the information identifying (i) a zone property, and (ii) an identified zone type;
identifying, in the designated home, a zone corresponding to the identified zone type;
filtering a list of available home automation devices in the designated home to identify all of the available home automation devices in the identified zone;
for each of the identified devices, querying a database to determine whether the respective device has a device state that contributes to the zone property;
storing a home-automation scene for the designated home, wherein the home-automation scene comprises information identifying (i) the devices that have a device state that contributes to the zone property, and (ii) the respective identified device states of those devices; and
in response to user selection of the stored home-automation scene, causing the devices that have a device state that contributes to the zone property to implement the respective identified device state.

2. The method of claim 1, wherein the zone property is a property selected from a list consisting of dark, secure, light, warmer, cooler, warm, cool, open, and breezy.

3. The method of claim 1, wherein the zone property is dark, and wherein:
at least one of the devices is a light, and
the identified device state of the light is off.

4. The method of claim 1, wherein the zone property is dark, and wherein:
at least one of the devices is a window shade, and
the identified device-state of the window shade is closed.

5. The method of claim 1, wherein the zone property is light, and wherein:
at least one of the devices is a light, and
the identified device-state of the light is on.

6. The method of claim 1, wherein the zone property is light, and wherein:
at least one of the devices is a window shade, and
the identified device-state of the window shade is open.

7. The method of claim 1, further comprising:
transmitting a discovery request and receiving, from at least one home automation device, a discovery response, and
including the at least one home automation device in the list of available home automation devices.

8. The method of claim 1, wherein a zone for a home automation device is determined based on an input from a user interface.

9. The method of claim 1, wherein causing the devices that have a device state that contributes to the zone property to implement the respective identified device state comprises transmitting action instructions to the respective home automation devices.

10. The method of claim 1, wherein causing the devices that have a device state that contributes to the zone property to implement the respective identified device state comprises transmitting action instructions and device-operation parameters to the respective home automation devices.

11. A home automation system comprising a processor, and a non-transitory computer-readable storage medium storing instruction operative, when executed on the processor, to perform functions comprising:
receiving information regarding a home-independent home automation scene, the information identifying (i) a zone property, and (ii) an identified zone type;
identifying, in the designated home, a zone corresponding to the identified zone type;
filtering a list of available home automation devices in the designated home to identify all of the available home automation devices in the identified zone;
for each of the identified devices, querying a database to determine whether the respective device has a device state that contributes to the zone property;
storing a home-automation scene for the designated home, wherein the home-automation scene comprises information identifying (i) the devices that have a device state that contributes to the zone property, and (ii) the respective identified device states of those devices; and
in response to user selection of the stored home-automation scene, causing the devices that have a device state that contributes to the zone property to implement the respective identified device state.

12. The system of claim 11, wherein the zone property is a property selected from a list consisting of dark, secure, light, warmer, cooler, warm, cool, open, and breezy.

13. The system of claim 11, wherein the zone property is dark, and wherein:
at least one of the devices is a light, and
the identified device state of the light is off.

14. The system of claim 11, wherein the zone property is dark, and wherein:
at least one of the devices is a window shade, and
the identified device-state of the window shade is closed.

15. The system of claim 11, wherein the zone property is light, and wherein:
at least one of the devices is a light, and
the identified device-state of the light is on.

16. The system of claim 11, wherein the zone property is light, and wherein:
at least one of the devices is a window shade, and
the identified device-state of the window shade is open.

17. The system of claim 11, wherein the functions further comprise:

transmitting a discovery request and receiving, from at least one home automation device, a discovery response, and     including the at least one home automation device in the list of available home automation devices,     determining whether the home automation device from which the discovery response was received is capable of effecting the zone property of the identified zone type.

\* \* \* \* \*